United States Patent [19]

Yoo et al.

[11] Patent Number: 5,587,976
[45] Date of Patent: Dec. 24, 1996

[54] OPTICAL PICKUP FOR OPTICAL MAGNETIC DISC

[75] Inventors: Jang-hoon Yoo, Seoul; Kyung-hwa Rim; Chong-sam Chung, both of Suwon; Chul-woo Lee, Seoul, all of Rep. of Korea

[73] Assignee: Samsung Electronics Co., Ltd., Kyungki-do, Rep. of Korea

[21] Appl. No.: 555,967

[22] Filed: Nov. 13, 1995

[30] Foreign Application Priority Data

Dec. 29, 1994 [KR] Rep. of Korea ............... 94-39004

[51] Int. Cl.⁶ ............................................. G11B 7/00
[52] U.S. Cl. .................... 369/13; 369/44.14; 369/44.37
[58] Field of Search ...................... 369/13, 44.11, 369/44.14, 44.15, 44.37, 44.38, 103, 105, 112, 43, 126; 360/114

[56] References Cited

U.S. PATENT DOCUMENTS

| 5,151,887 | 9/1992 | Miyazaki | 369/44.32 |
| 5,276,672 | 1/1994 | Miyazaki et al. | 369/126 |
| 5,461,605 | 10/1995 | Takimoto et al. | 369/126 |
| 5,537,372 | 7/1996 | Albrecht et al. | 369/43 |

*Primary Examiner*—Thang V. Tran
*Attorney, Agent, or Firm*—Burns, Doane, Swecker & Mathis, L.L.P.

[57] ABSTRACT

An optical pickup for an optical magnetic disc includes a light source, a grating for diffracting the light into a main light beam and auxiliary light beams, a plurality of magnetic dipole tips arranged above the optical magnetic disc so as to interact with the magnetic signal stored in the optical magnetic disc. Also, a plurality of mirror members each attached to the rear of each magnetic dipole tips are for reflecting the light incident on the mirror member, and a photodetector for detecting track errors and the stored information by receiving the light reflected from the mirror members are provided, thereby detecting the error signal and reproducing information by the interaction with the magnetic dipoles of the disc so that the recording density can be increased without increasing the conventional land and groove areas in the disc.

10 Claims, 3 Drawing Sheets

OPTICAL PICKUP FOR OPTICAL MAGNETIC DISC

BACKGROUND OF THE INVENTION

The present invention relates to an optical pickup for an optical magnetic disc which reproduces information recorded in the optical magnetic disc, and more particularly to an optical pickup for an optical magnetic disc including a magnetic dipole tip which is affected by the direction of the magnetic dipole of the optical magnetic disc.

Generally, there are three methods for reproducing information recorded in a disc in a non-contacting manner, i.e., the pit method, the phase transition method and the optical magnetic method.

According to the optical magnetic method, a magnetic dipole is formed on the recording surface of a disc and information is detected from an optical signal induced by the influence of the magnetic dipole. Also, it is possible to both record and eliminate information on the disc according to this method.

Referring to FIG. 1, a conventional optical pickup using the optical magnetic method comprises a light source 1 for generating a divergent light, a collimating lens 2 for collimating the light into parallel beams, a grating 3 for diffracting the parallel beam of light, a polarization beam splitter 4 for transmitting or reflecting incident light according to the polarization properties of the incident light, an object lens 5 for converging the light from light source 1 to form a spot on an optical magnetic disc 10, a hologram device 6 for separating the diffracted light reflected from disc 10, and a photodetector 7 for detecting the light separated by hologram device 6.

The zero order diffracted light (i.e., main light beam) and the ±1st order diffracted light (i.e., auxiliary light beams), which are diffracted in grating 3, are transmitted to disc 10 and form spots in land and groove areas of the disc, respectively. The polarization direction of the light reflected from disc 10 is determined according to the direction of the magnetization generated in disc 10 by the Kerr effect. The light reflected from the disc is reflected from or passes through beam splitter 4 depending on the light polarization. The light reflected from beam splitter passes through hologram device 6 toward photodetector 7. Photodetector 7 converts the received light into a electrical signal so that a tracking error signal is detected and the recorded information is reproduced, from the converted signal.

The conventional optical pickup for the optical magnetic disc of the above constituents, forms a light spot in a magnetic domain having a magnetic dipole, and reproduces information by receiving optical signals generated according to the direction of the magnetic dipole due to the Kerr effect and the existence or absence of the magnetic domain. The size of the magnetic domain affects the size of the light spot formed on the recording surface of the disk. In the conventional optical pickup, when the magnetic domain size is 0.1 μm, information detecting is very difficult even if a short wavelength light source of around 430 μm is used. Also, the optical pickup and the disc may be damaged since the optical pickup is located adjacent to the disc.

SUMMARY OF THE INVENTION

To solve the above problems, objects of the present invention include providing an optical pickup for an optical magnetic disc, in which signal detection is not affected by the size of the magnetic domain formed on the disc, preventing damage to the optical pickup and disc by making the gap between the disc and the optical pickup larger, and also providing high quality information.

To achieve the above objects, there is provide an optical pickup for an optical magnetic disc, which reproduces information stored in the optical magnetic disc, comprising: a light source; a grating for diffracting the light radiated from the light source into zeroth diffracted light and ±1st order diffracted light; a plurality of magnetic dipole tips, being arranged above the optical magnetic disc so as to interact with magnetic signals stored in the optical magnetic disc; a plurality of mirror members being each attached to the rear of each magnetic dipole tip for reflecting the light radiated from the light source; and a photodetector for detecting track errors and the stored information by receiving the light reflected from the mirror members.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
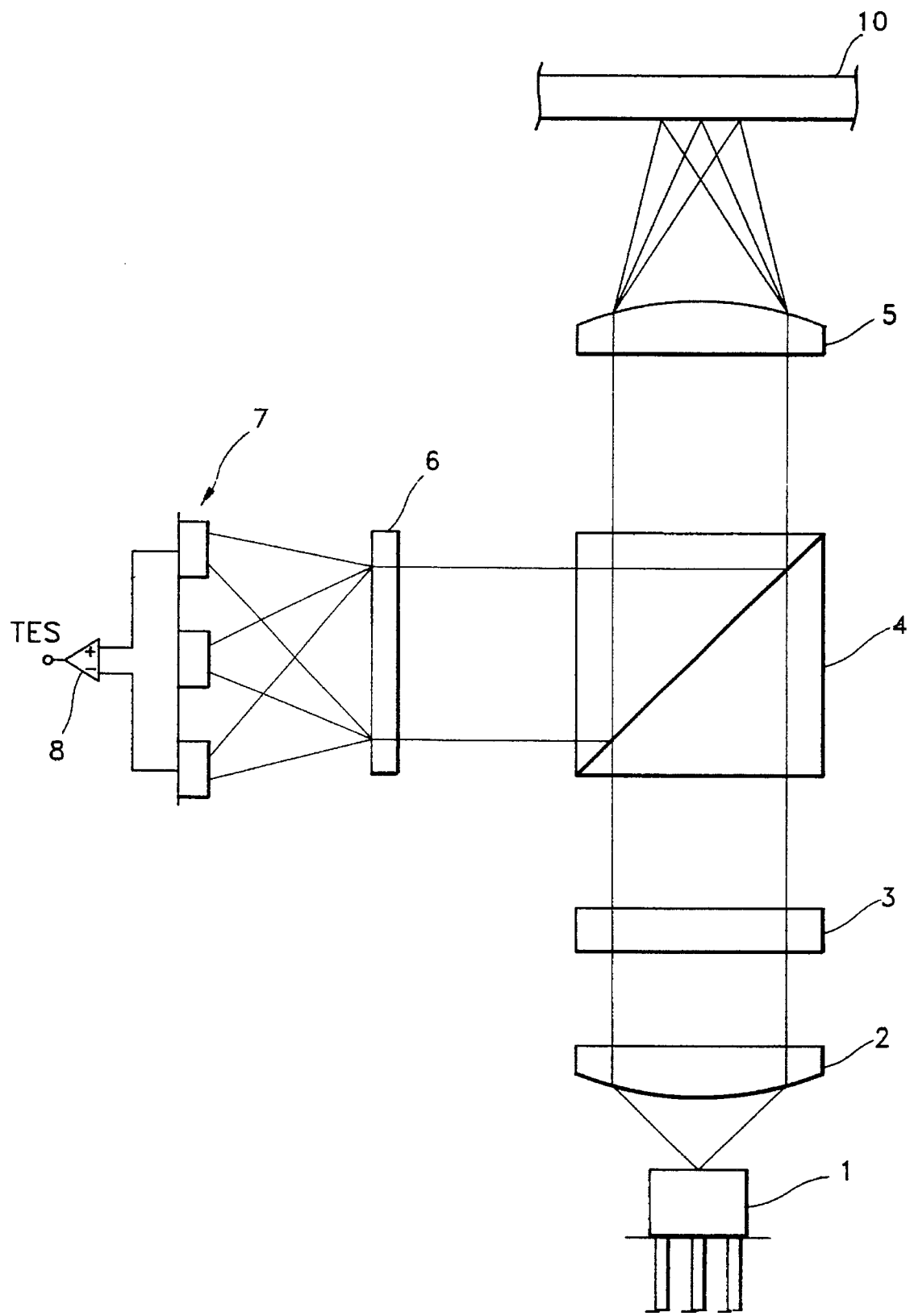
FIG. 1 is a schematic illustrating the arrangement of a conventional optical pickup for an optical magnetic disc.
Figure 2:
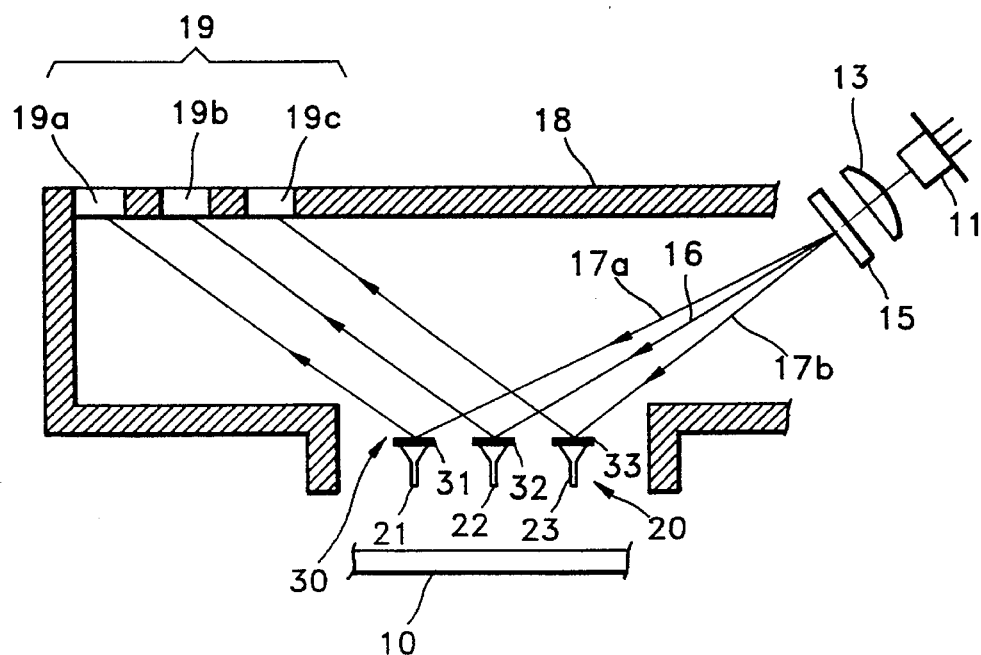
FIG. 2 is a schematic illustrating the arrangement of an optical pickup for an optical magnetic disc according to the present invention.

In FIG. 2, a plurality of magnetic dipole tips 20 are arranged above the recording surface of an optical magnetic disc 10 and oscillates according to the influence of the magnetic domain formed in the recording surface of optical magnetic disc 10. Mirror members 30 are respectively attached to the rear end of each tip. Further, a light source 11, a grating 15, a collimating lens 13 and a photodetector 19 are provided.

Light source 11 radiates light toward mirror members 30. Collimating lens 13 is arranged on the light path between light source 11 and grating 15, and converts the diverging light radiated from light source 11 into parallel light beams. Grating 15 is provided between collimating lens 13 and mirror member 30 to diffract the light passing through collimating lens 13 into a main light beam 16 (i.e., zero order diffracted light) and auxiliary light beams 17a, 17b (i.e., ±1st order diffracted light).

Photodetector 19 receives the main and auxiliary light beams which are reflected from mirror members 30 and having differentiated paths due to the magnetic oscillation of magnetic dipole tips 20 so as to detect track error signals and reproduce information. The photodetector 19 comprises a first photodetector 19b for receiving the zero order diffracted light which transfers the information stored in optical magnetic disc 10, and second photodetectors 19a and 19c which are divided into at least two light receiving regions, respectively to detect track error signals and send track error signals to differential amplifiers 40 and 41.

Figure 3:
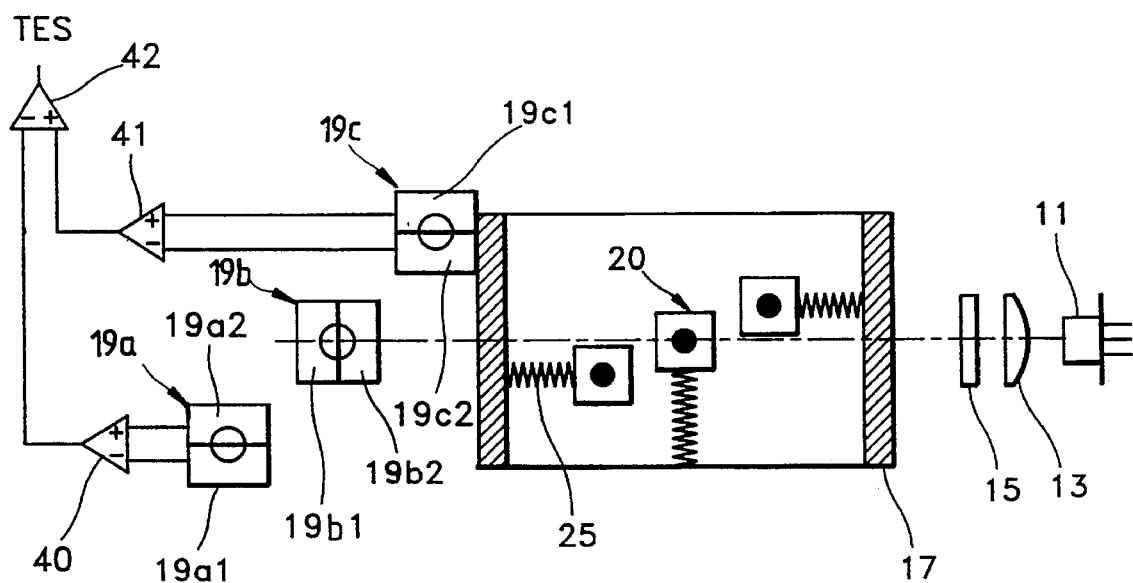
FIG. 3 is a schematic illustrating the arrangement of the optical pickup and a signal detecting means according to the present invention.

In FIG. 3, magnetic dipole tips 20 each are provided with an elastic member 25 for providing a restoring force by which each tip can be returned to its original position after magnetic oscillation.

Referring to FIG. 3, the light radiated from light source 11 is made into either a parallel beams by collimating lens 13 (or converging beams by converging lens 13). The light is diffracted into at least three diffraction orders by grating 15 toward mirror members 30. After reflection from mirror members 30, the reflected light proceeds to first photodetector 19b and second photodetectors 19a and 19c. Each photodetector 19a, 19b and 19c has at least two light receiving regions, 19a1 and 19a2, 19b1 and 19b2, 19c1 and 19c2. The main light beams (i.e., zero order diffracted light) received in first photodetector 19b is used for reproducing information, and the a pair of auxiliary light beams (i.e., ±1st order diffracted light) detected through second photodetectors 19a and 19c is used for detecting the tracking error signals. Output signals generated from the light receiving regions, 19a1, 19a2 of the second photodetector 19a, are supplied to a first differential amplifier 40 to derive a first difference signal between two regions. On the other hand, output signals generated from the light receiving regions, 19c1 and 19c2 of the second photodetector 19c, are supplied to a second differential amplifier 41 to derive a second difference signal. The second difference signal is subtracted from the first difference signal in a third differential amplifier 42 to obtain an actual track error signal. The track error detecting technique using differential amplifiers are well known in the art and has been fully explained, for example, in U.S. Pat. No. 5,151,887. Each magnetic dipole tip 20 is coupled by elastic member 25 to the inner wall of a housing 17 which is provided to enclose the tips and elastic members. Elastic member 25 provides a restoring force against the magnetic oscillation between optical magnetic disc 10 and magnetic dipole tip 20.

The magnetic domain distributed on the recording surface of optical disc 10, can be interpreted by the arrangement of the magnetic dipole.

Figure 4:
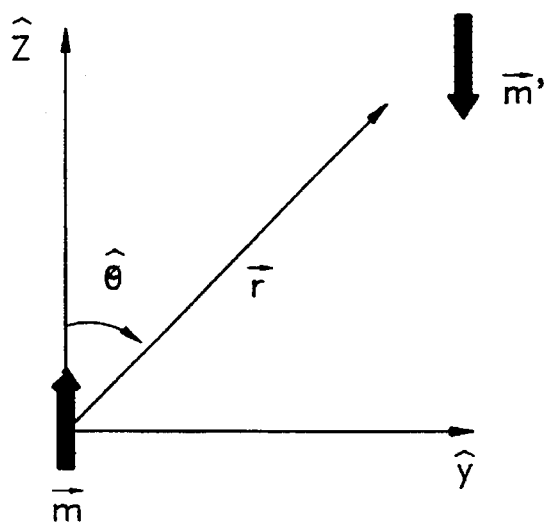
FIGS. 4 to 6 are schematics for explaining the interaction of the magnetic dipoles.

When the coordinates are selected as shown in FIG. 4, the vector potential and magnetic force of the magnetic dipole causes a force in a radial direction and an azimuth direction on a spherical coordinate system according to the following equations.

$$\vec{A} = \frac{\mu_o}{4\pi} \frac{\vec{m} \times \vec{r}}{r^3}$$

$$\vec{B} = \vec{\nabla} \times \vec{A} = \vec{r}_o \frac{\mu_o}{4\pi} \frac{2m\cos\theta}{r^3} + \vec{\theta}_o \frac{\mu_o}{4\pi} \frac{m\sin\theta}{r^3}$$

$$\vec{F} = \vec{\nabla}(\vec{m}' \cdot \vec{B}) = \frac{3\mu_o}{4\pi} \frac{mm'}{r^4} \{(1 - 3\cos^2\theta)\vec{r}_o - 2\sin\theta\cos\theta\vec{\theta}_o\}$$

Here, $\vec{A}$ is the vector potential of magnetic dipole moment $\vec{m}$, $\vec{B}$ is the magnetic field of magnetic dipole moment, and $\vec{F}$ is the force applied to another magnetic dipole moment $\vec{m}'$ in magnetic field $\vec{B}$. Also, $\vec{r}$ is the position vector between magnetic dipoles $\vec{m}$ and $\vec{m}'$, and $\vec{\theta}$ is the azimuth taken by $\vec{m}'$ on the Z-axis. The dipole moment $\vec{m}$ is the dipole of the present pickup and another dipole moment $\vec{m}'$ is the dipole inside of the disc. The vector constituent of $\vec{m}'$ can be separated as $$\vec{m}' = m(\vec{r}_o\cos\theta - \vec{\theta}_o\sin\theta),$$

where $\hat{r}_o$ and $\hat{\theta}_o$ are vector units.

Figure 5:
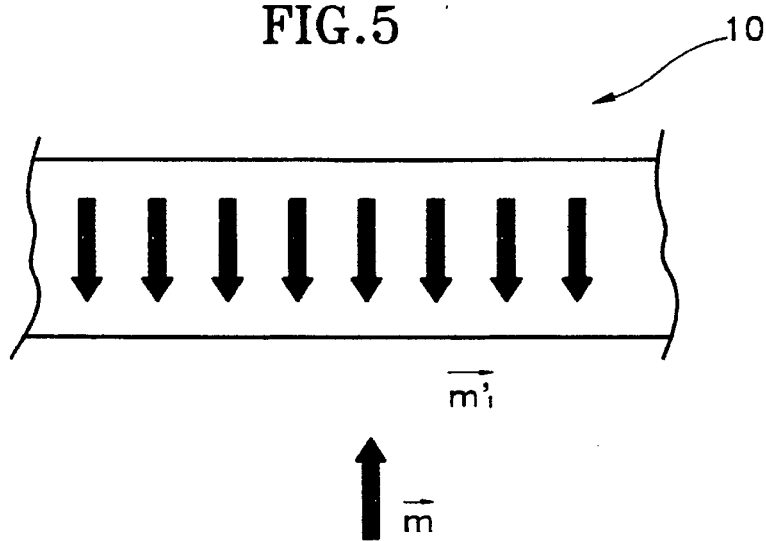

As shown in FIG. 5, when a magnetic dipole $\vec{m}'$ forms a vertical magnetic domain on optical magnetic disc 10, the force applied to the magnetic dipole tip $\vec{m}$ of the optical pickup is $$\vec{F}_m = \frac{3\mu_o}{8} \frac{mm'}{r^4} \hat{r}_o,$$

where m' is either +|m| (spin-up) or −|m| (spin-down).

Figure 6:
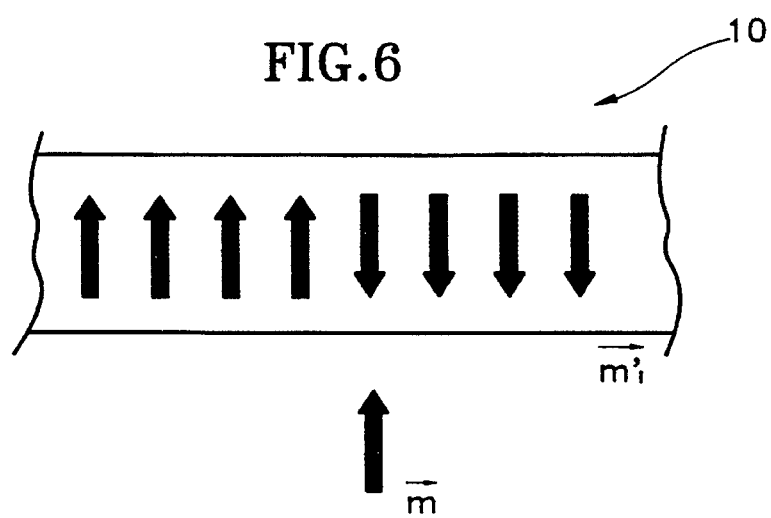

Also, as shown in FIG. 6, when the magnetic dipole ($\vec{m}'$) forms a vertical magnetic domain on optical magnetic disc 10, in the force applied to the magnetic dipole tip ($\vec{m}'$) of the optical pickup is $$\vec{F}_m = \frac{3\mu_o}{2\pi} \frac{mm'}{r^4} \hat{\theta}_o,$$

where m' is either +|m| (moving from spin-up viewed from the left to the right) or −|m| (moving from spin-down to spin-up).

As described above, the force applied to magnetic dipole tip 20 varies according to the arrangement of the magnetic domain formed on the optical disc. Magnetic dipole tip 20 and mirror member 30 oscillate in the applied direction of the force. The reflection path of the light from mirror member 30, is changed by this oscillation. From optical signals transmitted by the path-changed light, the information recorded on optical magnetic disc 10 can be reproduced by first photodetector 19b. When magnetic dipole tip 20 passes a part having no magnetic domain on optical magnetic disc 10, the magnetic dipole tip is affected by no force. If one of three magnetic dipole tips 20, to which ±1st order diffracted light is incident, faces the domain-formed surface on optical magnetic disc 10, the light path is changed by the effect of the magnetic dipole moment formed on the domain so that an actual track error signal is detected at differential amplifier 42 (FIG. 3). From this signal, a tracking error can be corrected.

According to the present invention, since light is not directly radiated onto the optical magnetic disc, the conventional land and groove areas formed to detect the track error signal are not required, which is very advantageous in increasing the recording density of the disc.

Also, the force of the magnetic dipole of the optical magnetic disc applied to magnetic dipole tip 20, in cases where the domain changes from spin-up to spin-down or vice versa is 4/π times greater than the force in case where the domain maintains a uniform spin-up or spin-down state. Hence, it is advantageous to detect the force applied to the magnetic dipole in the azimuth direction. Accordingly, as shown in FIG. 2, the reproducing signal and track signal are configured to obtain an edge detecting signal in a jitter direction and a track direction, respectively.

As described above, according to the present invention, since information is reproduced and the error signal detected by the light whose reflection path varies by the oscillation due to the magnetic force generated between the magnetization direction of the magnetic dipole formed in the magnetic domain and the magnetic dipole unit, the sizes of the magnetic domain and the light spot do not affect the reproducing signal so that the high density in the optical recording medium can be achieved by minimizing, relatively, the size of the magnetic domain. Also, the information reproduction and the error signal detection are performed by interaction with magnetic dipoles of the disc.

It will be appreciated by those of ordinary skill in the art that the present invention can be embodied in other specific forms without departing from the scope thereof. The presently disclosed embodiments are therefore considered in all respects to be illustrative and not restrictive. The scope of the invention is indicated by the appended claims rather than the forgoing description and all changes which come within the meaning and range of equivalents thereof are intended to be embraced therein.

What is claimed is:

1. An optical pickup for reproducing information stored in an optical magnetic disc, said optical pickup comprising:
   a light source;
   a grating for diffracting the light radiated from said light source into a main light beam and at least two auxiliary light beams;
   a plurality of magnetic dipole tips arranged above said optical magnetic disc so as to interact with magnetic signals stored in said optical magnetic disc;
   a plurality of mirror members being each attached to a rear end of each of said plurality of magnetic dipole tips for reflecting said main light beam and at least two auxiliary light beams; and
   a plurality of photodetectors for receiving the reflected light beams from said plurality of mirror members.

2. An optical pickup for reproducing information stored in an optical magnetic disc as in claim 1, further comprising elastic members for attaching said plurality of magnetic dipoles tips to a housing so as to provide a restoring force against a magnetic oscillation between said optical magnetic disc and said plurality magnetic dipole tips.

3. An optical pickup for reproducing information stored in an optical magnetic disc as in claim 2, wherein said housing encloses said plurality of magnetic dipole tips and said elastic members.

4. An optical pickup for reproducing information stored in an optical magnetic disc as in claim 1, wherein said plurality of magnetic dipole tips and mirror members comprised of at least three, respectively; and said plurality of mirror members receive and reflect said main light beam and at least two auxiliary light beams produced by said grating.

5. An optical pickup for reproducing information stored in an optical magnetic disc as in claim 1, wherein said plurality of photodetectors further detects track error signals.

6. An optical pickup for reproducing information stored in an optical magnetic disc as in claim 1, wherein said plurality of photodetectors includes first and a pair of second photodetectors.

7. An optical pickup for reproducing information stored in an optical magnetic disc as in claim 1, wherein each of said plurality of photodetectors comprised of at least two light receiving regions.

8. An optical pickup for reproducing information stored in an optical magnetic disc as in claim 5, wherein each of said plurality of photodetectors comprised of at least two light receiving regions.

9. An optical pickup for reproducing information stored in an optical magnetic disc as in claim 8, further comprising differential amplifiers to differentiate said track error signals in order to obtain an actual track error signal.

10. An optical pickup for reproducing information stored in an optical magnetic disc as in claim 1, further comprising a lens for collimating the light beam produced by said light source.

* * * * *